(12) United States Patent
Landon

(10) Patent No.: US 11,254,208 B2
(45) Date of Patent: Feb. 22, 2022

(54) ATV WITH RATCHETING FOUR WHEEL DRIVE ACTUATOR

(71) Applicant: ARCTIC CAT, INC., St. Cloud, MN (US)

(72) Inventor: Justin Arthur Landon, Wichita, KS (US)

(73) Assignee: ARCTIC CAT INC., Thief River Falls, MN (US)

( * ) Notice: Subject to any disclaimer, the term of this patent is extended or adjusted under 35 U.S.C. 154(b) by 0 days.

(21) Appl. No.: 17/176,038

(22) Filed: Feb. 15, 2021

(65) Prior Publication Data

US 2021/0162863 A1 Jun. 3, 2021

Related U.S. Application Data

(63) Continuation of application No. 15/968,023, filed on May 1, 2018, now Pat. No. 10,919,388.

(Continued)

(51) Int. Cl.
*B60K 23/08* (2006.01)
*B62K 23/06* (2006.01)

(52) U.S. Cl.
CPC .......... *B60K 23/0808* (2013.01); *B60K 23/08* (2013.01); *B62K 23/06* (2013.01); *B60K 2023/0875* (2013.01); *B60K 2023/0883* (2013.01); *B60K 2023/0891* (2013.01); *B60Y 2200/124* (2013.01); *B60Y 2300/80* (2013.01)

(58) Field of Classification Search
CPC .. B60K 17/3462; B60K 17/352; B60K 23/08; B60K 23/0808; B60K 2023/0875; B60K 2023/0883; B60K 2023/0891; B60Y 2200/124; B60Y 2300/80; F16C 1/10;

(Continued)

(56) References Cited

U.S. PATENT DOCUMENTS 3,765,261 A 10/1973 Hobbins
4,673,072 A 6/1987 Hosono et al.

(Continued)

OTHER PUBLICATIONS

"Final Office Action Received For U.S. Appl. No. 15/968,023, dated Jun. 9, 2020".

(Continued)

*Primary Examiner* — Adam D Rogers
(74) *Attorney, Agent, or Firm* — Kutak Rock LLP; Brian L. Main

(57) ABSTRACT

A system for and method of shifting a drive configuration of an all-terrain vehicle (ATV) is provided. The system includes a shifter assembly, a gear case, and a linkage assembly extending therebetween. The shifter assembly includes a trigger lever for receiving a mechanical user input, thereby moving the shifter assembly between a locked configuration and an unlocked configuration. The linkage assembly translates the user input to the gear case, thereby causing the gear case to shift between an engaged configuration and a disengaged configuration, respectively. A linkage biasing member provides mechanical flexibility between the shifter assembly and the gear case, facilitating shifting on the fly. The trigger lever is operated by toggling it from a rest position to a deployed position. Upon user release, the trigger lever is automatically returned to its rest position for future engagement by the user.

20 Claims, 8 Drawing Sheets

Related U.S. Application Data

(60) Provisional application No. 62/503,733, filed on May 9, 2017.

(58) Field of Classification Search
CPC ....... B62M 25/04; B62M 25/045; G05G 1/04; B62K 23/02; B62K 23/06
See application file for complete search history.

(56) References Cited

U.S. PATENT DOCUMENTS

| | | |
|---|---|---|
| 5,967,252 A | 10/1999 | Saban et al. |
| 6,182,784 B1 | 2/2001 | Pestotnik |
| 6,758,297 B2 | 7/2004 | Handa et al. |
| 7,437,969 B2 | 10/2008 | Ose |
| 8,156,841 B2 | 4/2012 | Yasuda et al. |
| 8,161,841 B2 | 4/2012 | Hara et al. |
| 8,678,976 B1 | 3/2014 | Wilson et al. |
| 8,790,217 B1 | 7/2014 | Bowers et al. |
| 8,960,040 B2 | 2/2015 | Wang |
| 9,156,518 B2 | 10/2015 | Kawakami |
| 9,200,699 B2 | 12/2015 | Sato et al. |
| 9,592,879 B2 | 3/2017 | Fukao et al. |
| 9,797,434 B2 * | 10/2017 | Kawakami ............ B62M 25/04 |
| 10,041,582 B2 | 8/2018 | Greasamer et al. |
| 10,919,388 B2 | 2/2021 | Landon |
| 2003/0057007 A1 | 3/2003 | Stevens |
| 2006/0219464 A1 | 10/2006 | Stevens |
| 2007/0051552 A1 | 3/2007 | Reed |
| 2018/0326847 A1 | 11/2018 | Landon |

OTHER PUBLICATIONS

"Non Final Office Action Received For U.S. Appl. No. 15/968,023, dated Feb. 14, 2020, 19 Pages.".
"Notice of Allowance received for U.S. Appl. No. 15/968,023, dated Oct. 13, 2020.".

* cited by examiner

ATV WITH RATCHETING FOUR WHEEL DRIVE ACTUATOR

CROSS-REFERENCE TO RELATED APPLICATIONS

This application is a continuation application of co-pending U.S. patent application Ser. No. 15/968,023, filed May 1, 2018, now U.S. Pat. No. 10,919,388, which claims priority pursuant to 35 U.S.C. 119(e) to U.S. Provisional Patent Application Ser. No. 62/503,733, filed May 9, 2017, the entire disclosures of which are incorporated herein by reference.

FIELD OF THE INVENTION

The present invention relates generally to motorized vehicles having variable drive configurations. More specifically, the present invention is concerned with an all-terrain vehicle (an "ATV") having a ratcheting shifter assembly for mechanically shifting the ATV between a two-wheel drive configuration and a four-wheel drive configuration.

BACKGROUND

Existing ATVs having variable drive configurations utilize an electronic actuator to shift the ATV from a two-wheel drive configuration to a four-wheel drive configuration. The actuator is controlled by an electronic switch, thereby enabling a user to change the drive configuration of the ATV by operating the switch. Unfortunately, the necessary components for such electrical systems are expensive and sometimes inadequate and/or unreliable in some ATV operating conditions. Furthermore, existing configurations make it difficult for a user to shift the ATV while riding. Consequently, it would be beneficial for an ATV to have a shifting system, such as a mechanical shifting system, that is less expensive and easier to use than existing shifting systems. It would also be beneficial for the shifting system to be adequate and reliable in all ATV operating conditions.

SUMMARY

In some examples, an ATV comprises a shifter assembly in mechanical communication with a gear case, thereby facilitating mechanical shifting of the gear case between a first/disengaged configuration and a second/engaged configuration. By shifting the gear case between its disengaged and engaged configurations, the ATV is shifted between two or more drive configurations, such as a two-wheel drive configuration and a four-wheel drive configuration. In some embodiments, the shifter assembly includes one or more feature for indicating the drive configuration of the ATV.

The shifter assembly includes a mechanical user interface, such as a trigger lever, for receiving a mechanical input from a user of the ATV. A linkage assembly extends between the shifter assembly and the gear case for translating the user input to the gear case. In this way, the user is able to control the configuration of the gear case, thereby controlling the drive configuration of the ATV.

In some embodiments, the shifter assembly is secured to a handlebar of the ATV in close proximity to a handgrip of the ATV such that a user can quickly and easily operate the trigger lever with an index finger and/or a thumb. For instance, in some embodiments the trigger lever includes a click or toggle feature for allowing a user to quickly and easily move the trigger lever from a first/rest configuration to a second/deployed configuration. In some embodiments, the trigger lever is biased towards the rest configuration such that movement of the trigger lever from its deployed configuration back to its rest configuration is accomplished simply by releasing the lever. In this way, the trigger lever is automatically returned to its rest configuration for future engagement by the user.

In some embodiments, the shifter assembly includes a ratcheting assembly/mechanism for mechanically moving the shifter assembly between locked and unlocked configurations, thereby mechanically setting the ATV in one or more drive configurations. In some embodiments, movement of the trigger lever from its rest configuration to its deployed configuration causes the ratcheting assembly to move from its locked configuration to its unlocked configuration, or vice versa. In some embodiments, moving the trigger lever from its deployed position to its rest position has no effect on the configuration of the ratcheting assembly.

In some embodiments, the linkage assembly includes a linkage biasing member, such as a spring, so as to provide mechanical flexibility between the shifter assembly and the gear case. In this way, internal components of the gear case, such as splines on a shift collar, are provided time to align upon actuation.

In some embodiments, the gear case is biased towards its disengaged configuration such that moving the shifter assembly from its locked configuration to its unlocked configuration causes the gear case to move towards its disengaged configuration. In some embodiments, any biasing force associated with the linkage biasing member is overcome by an opposed biasing force associated with the gear case when the shifter assembly is in its unlocked configuration. Conversely, the biasing force associated with the linkage biasing member overcomes the biasing force associated with the gear case when the shifter assembly is in its locked configuration. In this way, the configuration of the shifter assembly controls the configuration of the gear case, thereby controlling the drive configuration of the ATV.

The foregoing and other objects are intended to be illustrative and are not meant in a limiting sense. Many possible embodiments may be made and will be readily evident upon a study of the following specification and accompanying drawings comprising a part thereof. Various features and subcombinations may be employed without reference to other features and subcombinations. Other objects and advantages will become apparent from the following description taken in connection with the accompanying drawings, wherein is set forth by way of illustration and example, one or more embodiments of the invention(s) and various features thereof.

BRIEF DESCRIPTION OF THE DRAWINGS

One or more preferred embodiments illustrative of the best mode in which the applicant has contemplated applying the principles, is set forth in the following description and is shown in the drawings and is particularly and distinctly pointed out and set forth in the appended claims.

DETAILED DESCRIPTION

One or more embodiments are disclosed herein; however, it is to be understood that the one or more embodiments are merely exemplary of the principles of the invention(s), which may be embodied in various forms. Therefore, specific structural and functional details disclosed herein are not to be interpreted as limiting, but merely as a basis for the claims and as a representative basis for teaching one skilled in the art to variously employ the teachings herein in any appropriately detailed structure.

Figure 1:
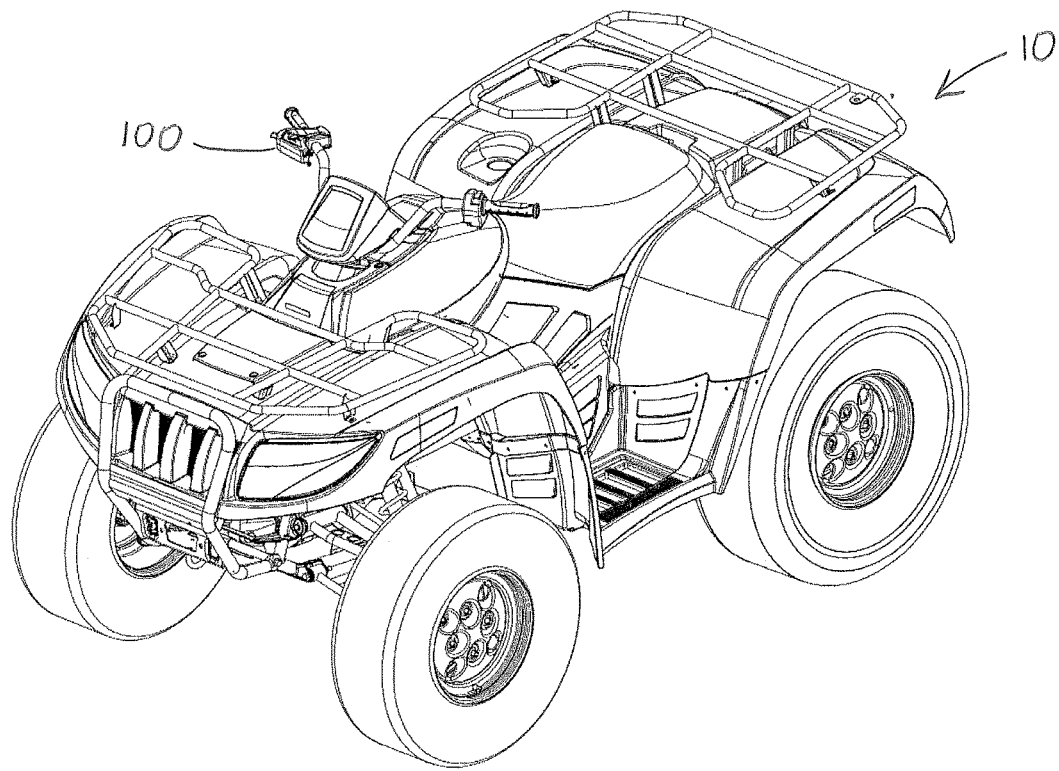
FIG. 1 is an isometric view of an all-terrain vehicle (ATV) with a mechanical shifter assembly secured to a handlebar thereof.

FIG. 1 shows an embodiment of a four-wheel all-terrain vehicle ("ATV") 10 having a shifter assembly 100 for shifting the ATV between a two-wheel drive configuration (a "first configuration") and a four-wheel drive configuration (a "second configuration"). It will be appreciated that other embodiments include a different number of wheels or other drive mechanisms and/or different variable drive configurations. In each embodiment, the ATV is configured to shift between first and second drive configurations, wherein power is directed to a first number of wheels when the ATV is in the first drive configuration and a second number of wheels when the ATV is in the second drive configuration. In some embodiments, the second number of wheels is greater than the first number of wheels. In other embodiments, the first number of wheels is greater than the second number of wheels.

Figure 2:
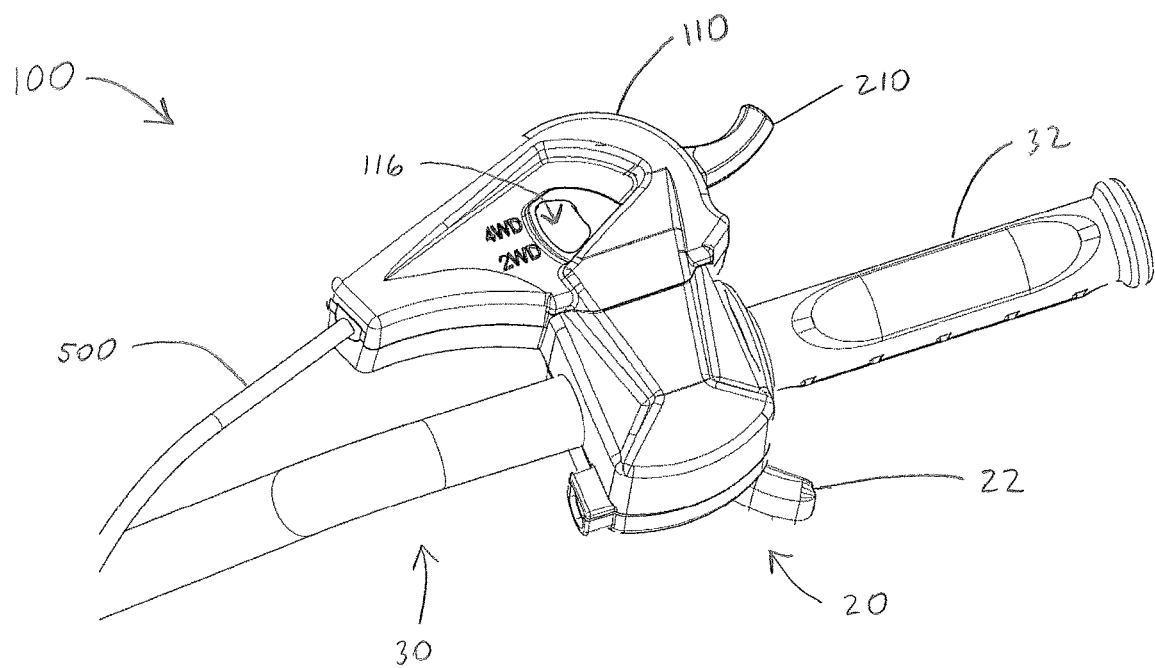
FIG. 2 is an isometric view of a mechanical shift assembly secured to a handlebar of an ATV.

FIG. 2 shows an embodiment of the shifter assembly 100 secured to a handlebar 30 of the ATV and a portion of a linkage assembly 500 extending from the shifter assembly 100. The shifter assembly 100 includes a mechanical user interface, such as a trigger lever 210, so as to provide a user of the ATV the ability to shift the ATV between first and second configurations. In some embodiments, the shifter assembly is positioned in close proximity to a handgrip 32 of the ATV (e.g., within 4 inches) so as to facilitate safe and easy operation of the trigger lever 210 by a user while the user is operating the ATV. In some embodiments, the trigger lever 210 is positioned relative to the handgrip 32 such that the user can operate the trigger lever 210 with an index finger of the hand while the hand is still gripping the handgrip, thereby allowing the user to maintain a constant grip on the handgrip while mechanically shifting drive configurations of the ATV.

In some embodiments, the shifter assembly 100 is configured to shift the ATV from a first drive configuration to a second drive configuration by moving the trigger lever 210 from a first position to a second position. In some embodiments, the shifter assembly 100 is similarly configured to shift the ATV from its second drive configuration to its first drive configuration by moving the trigger lever 210 from its first position to its second position. In some embodiments, the shifter assembly 100 includes a trigger biasing member 250 for biasing the trigger lever 210 towards its first position, thereby automatically reconfiguring the shifter assembly 100 for mechanically shifting the ATV from the second drive configuration to the first drive configuration following shifting the ATV from the first drive configuration to the second drive configuration, or vice versa. In some embodiments, the shifter assembly includes a position indicator 330 for indicating the configuration of the ATV. In some embodiments, the shifter assembly 100 further includes indicia corresponding with one or more position of the position indicator 330, such indicia providing an indication of the configuration of the ATV based on the position of the position indicator 330.

In some embodiments, the shifter assembly includes a housing 110 having a bottom portion 112 and a top portion 114 secured together to form an interior area 115 that is at least partially enclosed, thereby serving aesthetic, safety, protective, and/or functional purposes. In some embodiments, as shown in FIG. 2, the housing 110 defines an aperture 116 through which the position indicator 330 is visible. In some such embodiments, a lens cover 118 is positioned over at least part of the aperture 116. It will be appreciated that other embodiments, not shown, the position indicator 330 extends from the housing 110 and/or is positioned outside of the housing 110.

Still referring to FIG. 2, some embodiments further include a throttle lever 22 of a throttle assembly 20 positioned at or near the trigger lever 210 such that a user can operate the throttle lever 22 with the same hand used to operate the trigger lever 210. In this way, the user can control the speed and the drive configuration of the ATV with a single hand. In some embodiments, the throttle lever is positioned relative to the handgrip 32 such that the user can operate the throttle lever 22 with a thumb of the hand gripping the handgrip, thereby allowing the user to maintain a constant grip on the handgrip while operating the throttle lever. It will be appreciated that in other embodiments the trigger lever will be positioned so as to accommodate operation by the user's thumb, by one or more of the user's fingers, and/or by a palm of the user. It will further be appreciated that in other embodiments the throttle lever will be positioned so as to accommodate operation by one or more of the user's fingers and/or by the palm of the user's hand.

Figure 3:
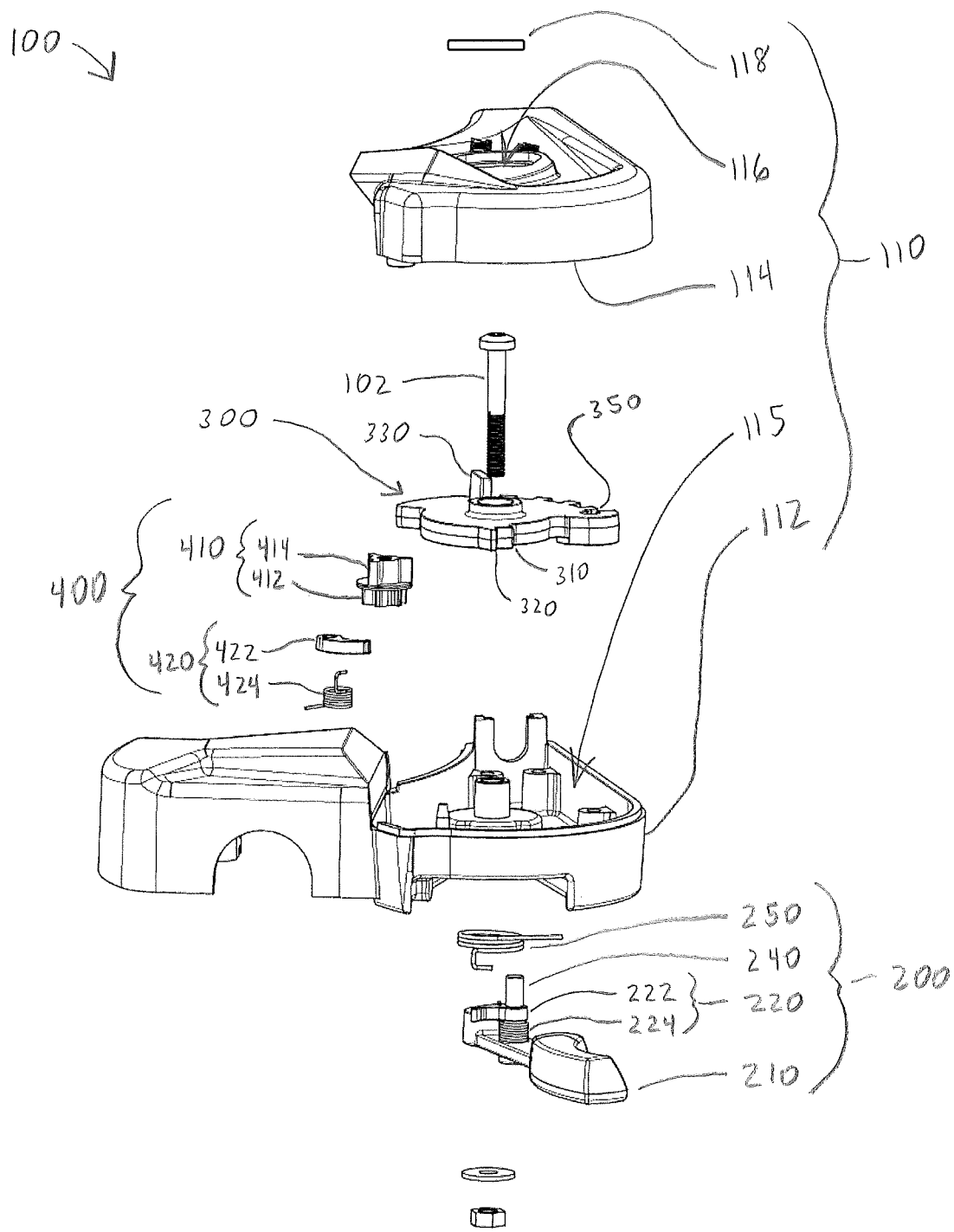
FIG. 3 is an exploded view of the mechanical shift assembly of FIG. 2.

Referring to FIG. 3, the shifter assembly 100 includes a trigger assembly 200 and a cam 300. The trigger assembly 200 is moveable from a rest configuration towards an advanced configuration by moving the trigger lever 210 from a first position towards a second position. Similarly, the linkage assembly 500 is movable between a first configuration and a second configuration by moving the cam 300 between a first position and a second position, respectively. In some embodiments, the position indicator 330 extends from the cam 300 such that the position indicator 330 provides an indication of the position of the cam 300 and/or a position of the linkage assembly. In some embodiments, the trigger lever 210 and/or the cam 300 is configured to rotate about a primary axis of the shifter assembly 100 such that movement of the trigger lever 210 and/or cam 300 between respective first and second positions is accomplished by rotating about the primary axis. In some embodiments, the primary axis is defined by a primary pin 102 of the shifter assembly.

In some embodiments, at least part of the trigger assembly 200 and the cam 300 are positioned at least partially within an interior area 115 of a housing 110 of the shifter assembly 100, with the trigger lever 210 extending from the housing for selective engagement by a user of the ATV. In some embodiments, a primary pin 102 extends into the interior area 115 of the housing 110 so as to provide support about which the trigger lever 210 and cam 300 are configured to rotate.

Still referring to FIG. 3, the shifter assembly 100 further includes a ratchet assembly 400. The ratchet assembly 400 includes a ratchet gear 410 for selective engagement with the trigger assembly 200 and/or the cam 300. In some embodiments, the ratchet gear 410 includes a first portion 412 for selective engagement with the trigger assembly 200 and a second portion 414 for selective engagement with the cam 300. The ratchet assembly 400 is moveable between a locked configuration and an unlocked configuration. In some embodiments, moving the ratchet assembly 400 between locked and unlocked configurations causes the shifter assembly 100 to move between respective locked and unlocked configurations. In the unlocked configuration, the ratchet assembly 400 is configured to allow the cam 300 to move freely between its first and second positions. In the locked configuration, the ratchet assembly is configured to retain the cam 300 in its second position. In some embodiments, the ratchet gear 410 is configured to rotate about an auxiliary axis of the shifter assembly 100 such that rotation of the ratchet gear 410 causes the ratchet assembly 400 to move between its locked and unlocked configurations. In some embodiments, the auxiliary axis is parallel with the primary axis.

Figure 7A:
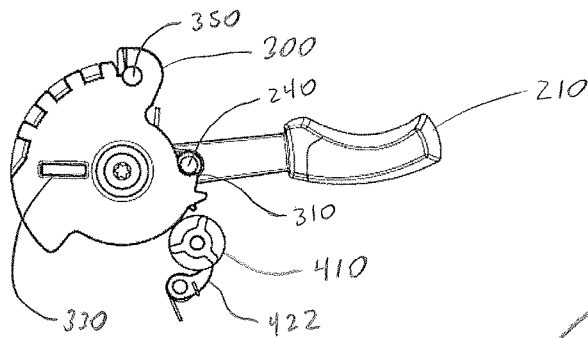
FIG. 7A is a top view of a portion of the mechanical shift assembly of FIG. 2, shown in a first configuration.
Figure 7B:
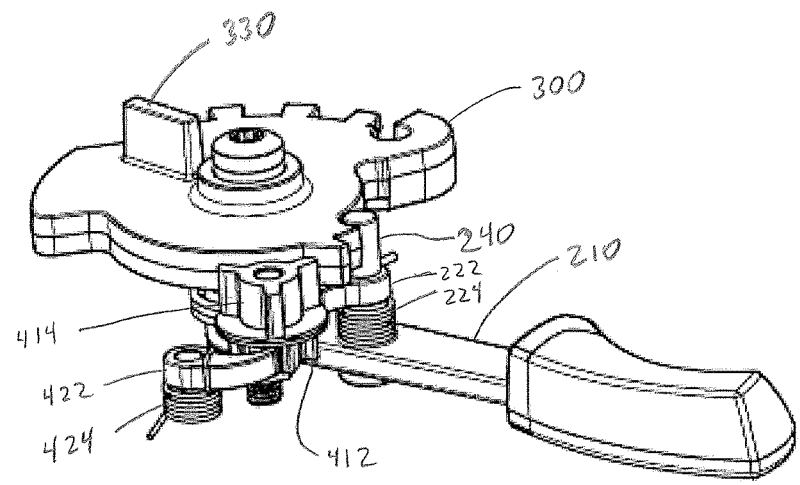
FIG. 7B is an isometric view of the portion of the mechanical shift assembly of FIG. 7A, shown on an enlarged scale.
Figure 8A:
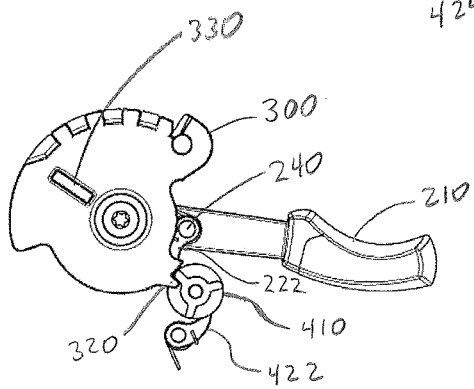
FIG. 8A is a top view of a portion of the mechanical shift assembly of FIG. 2, shown in a second configuration.
Figure 8B:
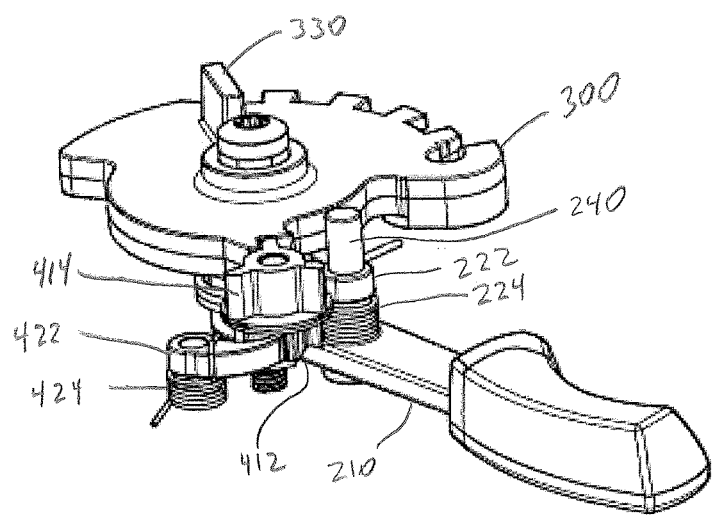
FIG. 8B is an isometric view of the portion of the mechanical shift assembly of FIG. 8A, shown on an enlarged scale.
Figure 9:
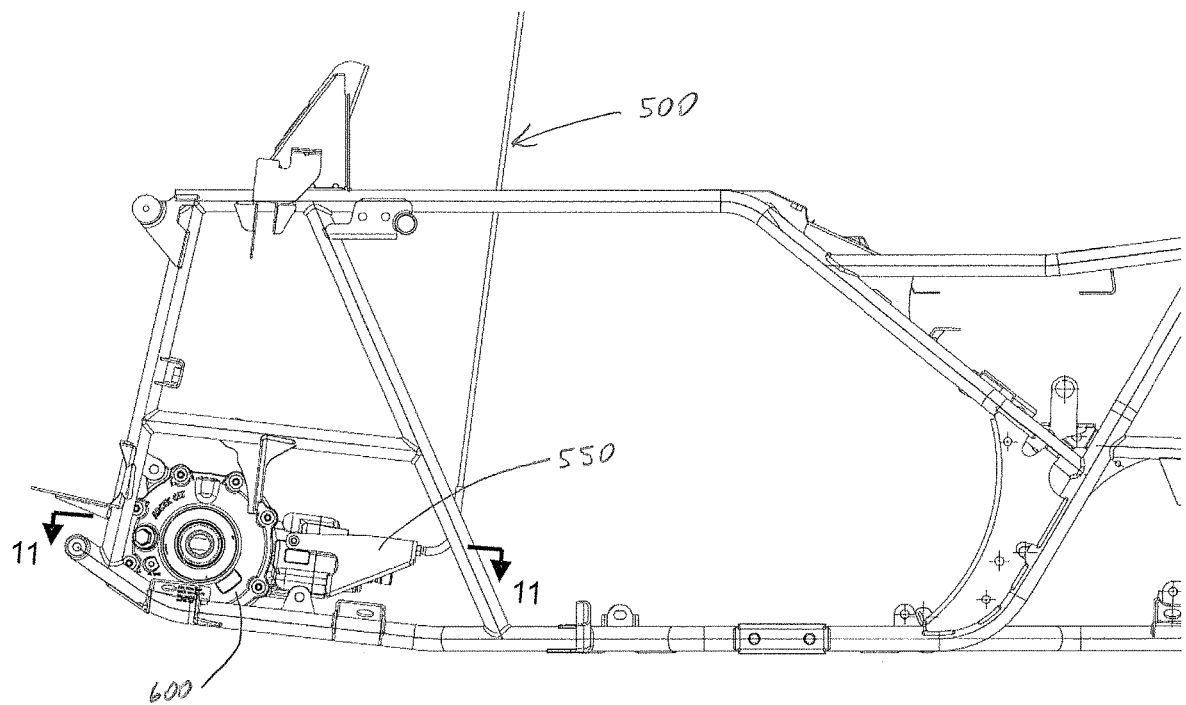
FIG. 9 is a side elevation view of a portion of a frame of an ATV, showing a linkage assembly of the ATV extending towards a front gear case of the ATV.

The trigger assembly 200 includes one or more features for selectively engaging with the cam 300. In some embodiments, an engagement pin 240 extends from the trigger lever towards the cam. Referring to FIGS. 7A and 7B, some embodiments of the shifter assembly 100 are configured such that the engagement pin 240 of the trigger assembly 200 is positioned adjacent to an engagement lip 310 of the cam 300 when the cam 300 and the trigger lever 210 are in their respective first positions, thereby causing the trigger assembly 200 to be engaged with the cam 300. It will be appreciated that in other embodiments, depending on the relative travel of the trigger lever 210 and the cam 300, the engagement pin 240 is displaced from the engagement lip 310 when the cam 300 and the trigger lever 210 are in their respective first positions. In some such embodiments, the engagement pin 240 of the trigger assembly 200 is configured to engage with the engagement lip 310 of the cam 300 as the trigger lever is moved towards its second position. When engaged with the engagement lip 310 of the cam 300, the engagement pin 240 of the trigger assembly 200 urges the cam 300 towards its second position as the trigger lever 210 moves towards its second position.

Some embodiments of the trigger assembly 200 include an advancement mechanism 220 for advancing the ratchet assembly 400 between locked and unlocked configurations. In some embodiments, the advancement mechanism 220 includes an advancement pawl 222 that is configured to urge the ratchet assembly 400 towards its locked configuration as the trigger lever 210 and the cam 300 move towards their respective second positions. In this way, the ratchet assembly 400 advances from its unlocked configuration to its locked configuration, thereby engaging with a locking lip 320 of the cam 300 so as to secure the cam 300 in its second position. In some embodiments, the advancement mechanism 220 is configured to urge the ratchet assembly 400 towards its unlocked configuration, thereby disengaging the ratchet assembly 400 from the locking lip 320 of the cam 300 so as to allow the cam 300 to move away from its second position.

In some embodiments, the advancement mechanism 220 includes an advancement pawl 222 for selective engagement with the ratchet gear 410 of the ratchet assembly 400. As the trigger lever 210 moves towards its second position, the advancement pawl 222 causes the ratchet gear 410 to rotate in a first direction, thereby causing the ratchet assembly to advance from its unlocked configuration to its locked configuration and/or from its locked configuration to its unlocked configuration. In some embodiments, the advancement mechanism 220 includes an advancement biasing member 224 for biasing the advancement pawl 222 into engagement with one or more tooth of the ratchet gear 410 while the trigger lever 210 moves from its first position to its second position. In some embodiments, the advancement pawl 222 disengages from the ratchet gear 410 as the trigger lever 210 moves from its second position to its first position. In this way, the advancement mechanism is capable of rotating the ratchet gear 410 in the first direction but not a second direction.

In some embodiments, the ratchet assembly 400 further includes a stop mechanism 420 for preventing the ratchet gear 410 from rotating in the second direction. In some embodiments, the stop mechanism includes a stop pawl 422 that is configured to selectively engage with the ratchet gear 410 as the trigger lever 210 when the ratchet assembly 400 is in its locked or unlocked configuration. In this way, the stop mechanism 420 selectively restricts the ratchet assembly 400 from moving between its locked and unlocked configurations. In some embodiments, the stop mechanism 420 includes a stop biasing member 424 for biasing the stop pawl 422 into engagement with one or more tooth of the ratchet gear 410 when the ratchet assembly 400 is in its locked or unlocked configuration, thereby preventing the ratchet gear 410 from rotating in the second direction. In some embodiments, the stop pawl 422 disengages from the ratchet gear 410 as the ratchet gear 410 rotates in the first direction. In this way, the advancement mechanism is capable of preventing the ratchet gear 410 from rotating in the second direction without preventing rotation in the first direction.

Figure 4A:
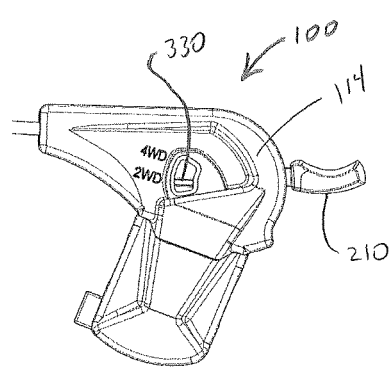
FIG. 4A is a top view of the mechanical shift assembly of FIG. 2, shown in a first configuration.
Figure 4B:
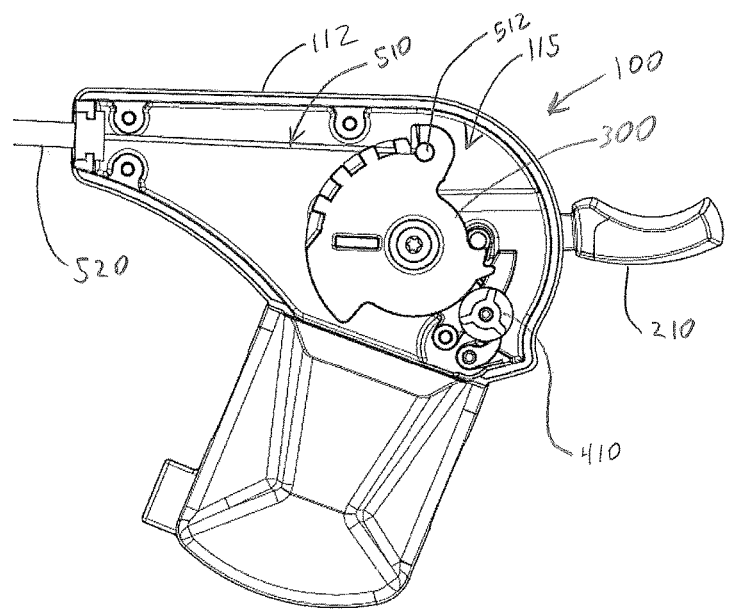
FIG. 4B is the top view of FIG. 4A, shown on an enlarged scale and with a top portion of a housing removed.
Figure 5A:
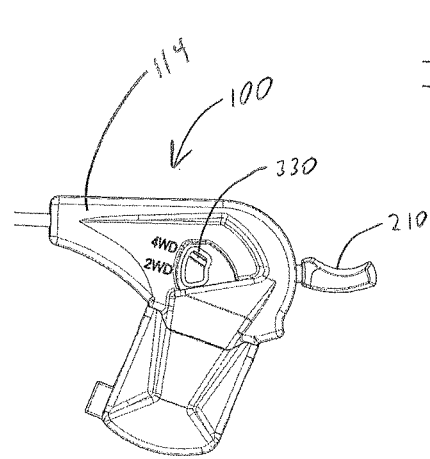
FIG. 5A is a top view of the mechanical shift assembly of FIG. 2, shown in a second configuration.
Figure 5B:
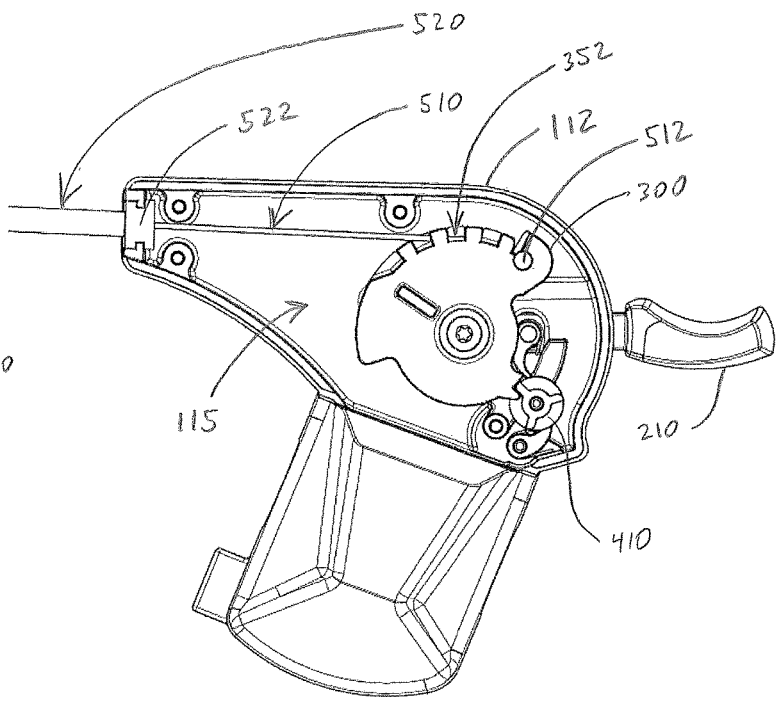
FIG. 5B is the top view of FIG. 5A, shown on an enlarged scale and with a top portion of a housing removed.
Figure 6A:
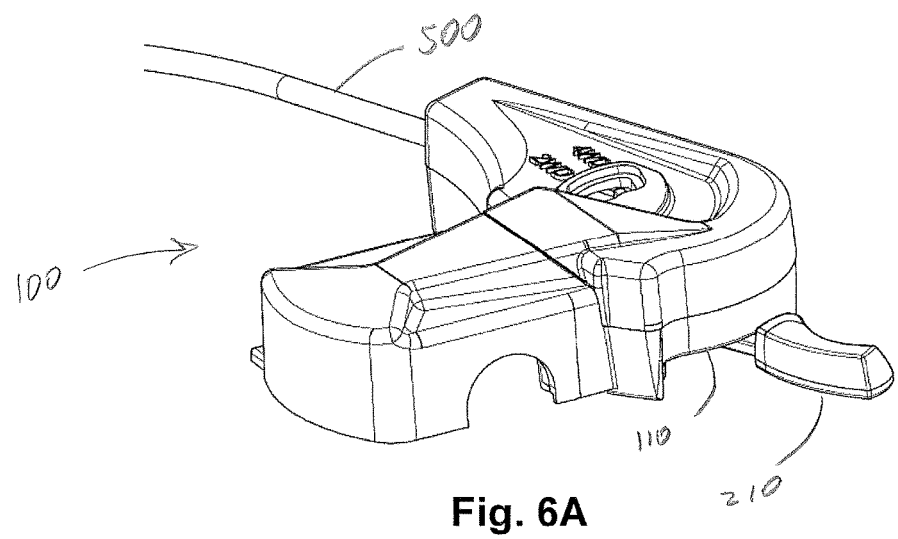
FIG. 6A is an isometric view of the mechanical shift assembly of FIG. 2.
Figure 6B:
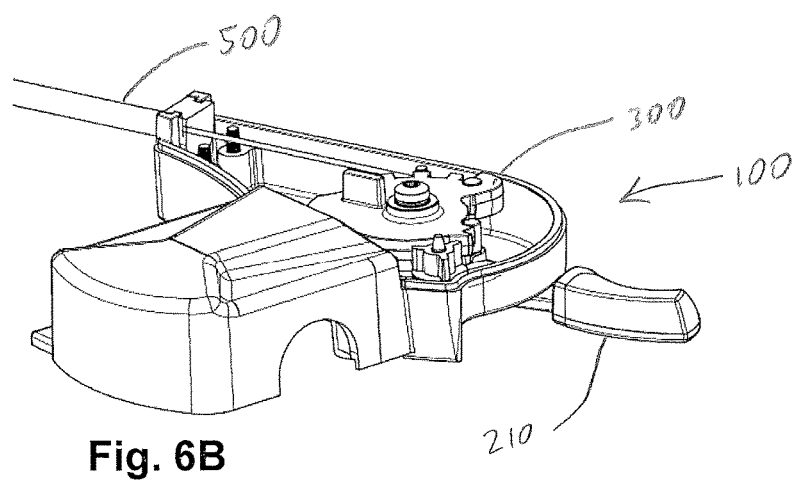
FIG. 6B is an isometric view of FIG. 6A, shown in a first configuration with a top portion of a housing removed.
Figure 6C:
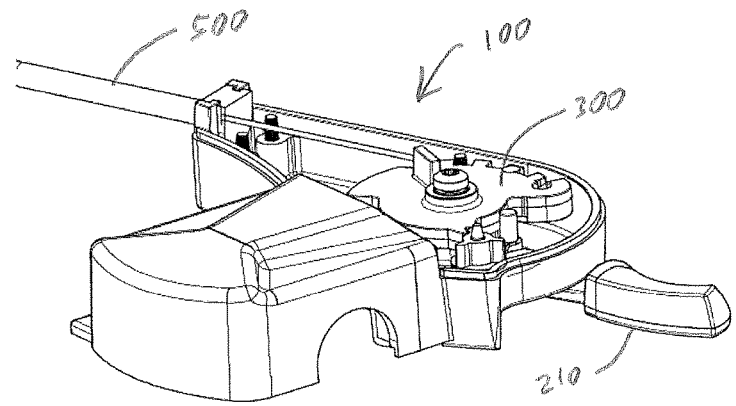
FIG. 6C is an isometric view of FIG. 6A, shown in a second configuration with a top portion of a housing removed.

Referring to FIGS. 4B and 5B, the cam 300 defines a receptacle 350 for receiving a first end 512 of an inner wire 510 of the linkage assembly 500, thereby coupling the linkage assembly to the cam. In some embodiments, a first end 522 of an external sheath 520 of the linkage assembly 500 is secured relative to the shifter assembly 100 such that movement of the cam 300 between its first and second positions causes the inner wire 510 of the linkage assembly 500 to move relative to the external sheath 520 of the linkage assembly 500, thereby moving the linkage assembly 500 between first and second configurations. In some embodiments, the cam 300 further defines a raceway 352 extending from the receptacle 350 such that as the cam 300 moves towards its second position, a portion of the inner wire 510 of the linkage assembly is received by the raceway 352 of the cam 300, thereby controlling the amount of travel of the inner wire 510 relative to the external sheath 520.

Referring to FIGS. 9 through 12, the linkage assembly 500 extends towards a gear case 600 of the ATV, such as a front gear case. In some embodiments, a linkage bracket 550 extends from the gear case 600 and/or is otherwise secured relative to the gear case. The linkage bracket 550 is configured to receive a second end 524 of the external sheath 520 of the linkage assembly 500, thereby securing the second end 524 of the external sheath 520 relative to the gear case 600. In this way, a constant distance is established between the gear case 600 and the second end 524 of the external sheath 520 such that a second end 514 of the inner wire 510 is caused to travel relative to the gear case 600 as the linkage assembly 500 is moved between its first and second configurations, thereby causing the gear case 600 to move between respective first/disengaged and second/engaged configurations. Each first and second configuration of the gear case 600 and the linkage assembly 500 is associated with a respective first or second drive configuration of the ATV.

In some embodiments, the gear case 600 is biased towards its disengaged configuration. In some such embodiments, such as the embodiment shown in FIGS. 11 and 12, the gear case 600 includes a disengagement biasing member 602 for biasing the gear case towards its disengagement configuration, thereby biasing the ATV towards its first drive configuration. In some embodiments, moving the linkage assembly 500 from its first configuration to its second configuration overcomes a biasing force associated with the disengagement biasing member, causing the gear case 600 to move towards its engaged configuration, thereby causing the ATV to move towards its second drive configuration.

Figure 10:
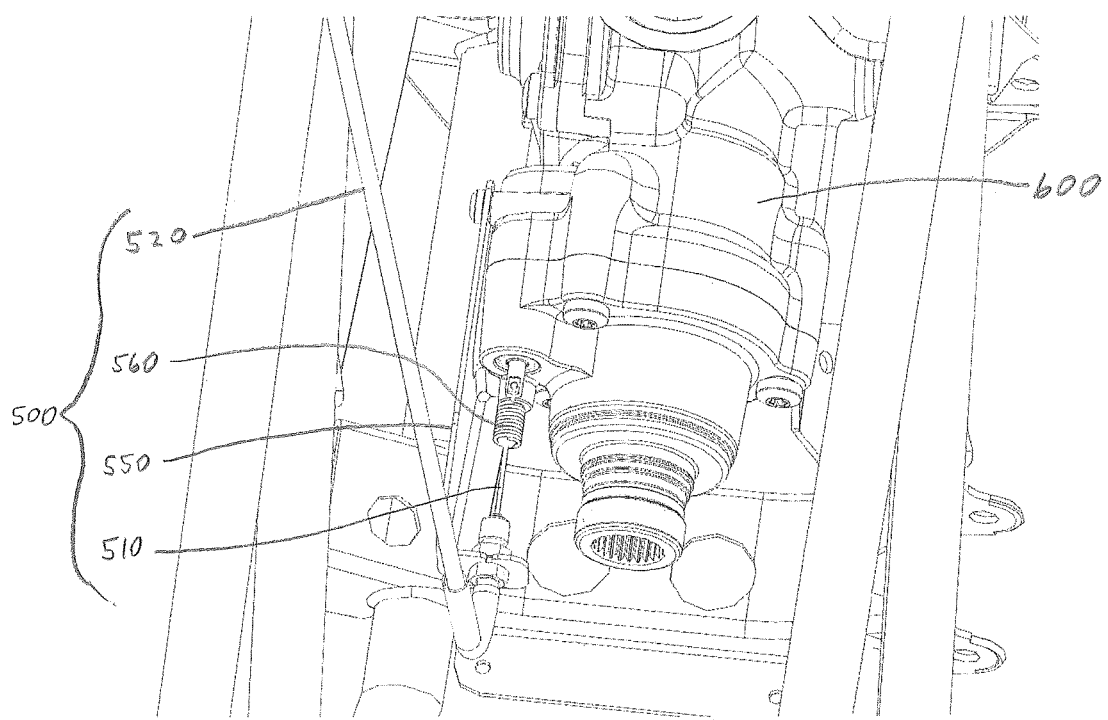
FIG. 10 is an isometric view of a portion of the frame and gear case of FIG. 9.
Figure 11:
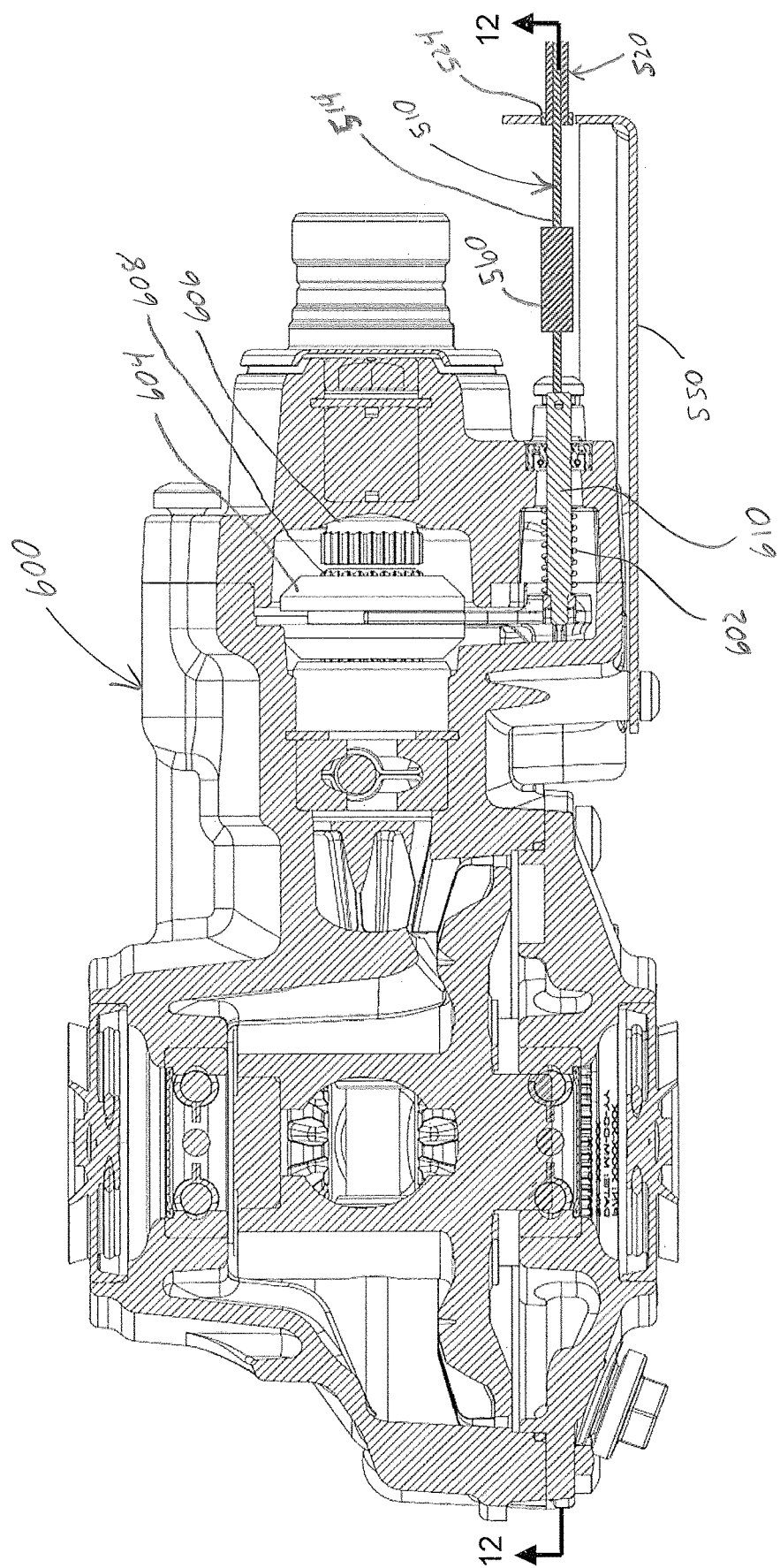
FIG. 11 is a sectional view of the gear case, taken along line 11-11 of FIG. 9.
Figure 12:
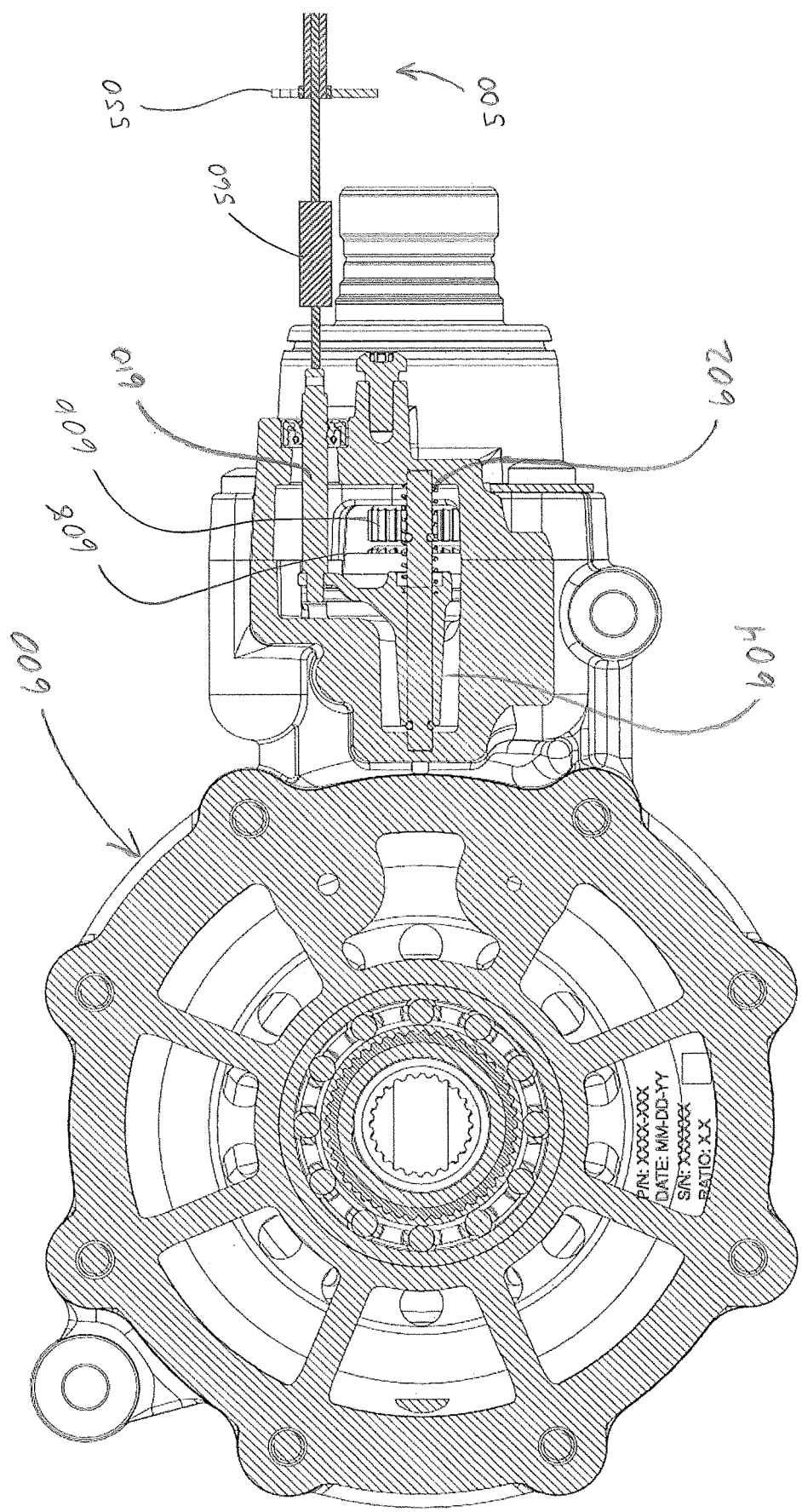
FIG. 12 is a sectional view of the gear case, taken along line 12-12 of FIG. 11.

In some embodiments, as shown in FIG. 10, the ATV includes a linkage biasing member 560 for biasing the gear case towards its engaged configuration, thereby biasing the ATV towards its second drive configuration. In some embodiments, moving the linkage assembly from its first configuration to its second configuration causes a biasing force associated with the linkage biasing member 560 to overcome the biasing force associated with the disengagement biasing member 602, thereby causing the gear case to move towards its engaged configuration. Conversely, moving the linkage assembly from its second configuration to its first configuration allows the biasing force associated with the disengagement biasing member to overcome the biasing force associated with the linage biasing member, thereby allowing the gear case to move towards its disengaged configuration.

In some embodiments, the disengagement biasing member is an internal biasing member positioned at least partially within an interior area of the gear case. In some embodiments, the linkage biasing member is an external biasing member positioned at least partially outside of an interior area of the gear case.

In some embodiments, the linkage biasing member 560 extends between the gear case 600 and the second end 514 of the inner wire 510 of the linkage assembly 500. In some embodiments, the biasing member is coupled, directly or indirectly, to a rod 610 or other feature of the gear case 600 such that the biasing force associated with the linkage biasing member excerpts a translational force on the rod 610. In some embodiments, the rod 610 is coupled to a carriage assembly 604 or other feature of the gear case 600, such feature being configured to selectively engage with a drive gear 606 or other feature of the ATV 10. In some embodiments, the carriage assembly 604 includes a shift collar 608 that is configured to mesh with the drive gear 606 when the carriage assembly 604 is in an engaged configuration, thereby creating a mechanical link between a power source of the ATV and one or more wheel of the ATV, the creation of such mechanical link causing the ATV to move from its first drive configuration to its second drive configuration. In some embodiments, moving the carriage assembly 604 away from its engaged configuration towards a disengaged configuration breaks the mechanical link between the power source of the ATV and the one or more wheel of the ATV, thereby causing the ATV to move from its second drive configuration to its first drive configuration. In some embodiments, the disengagement biasing member 602 of the gear case 600 is configured to bias the carriage assembly 604 towards its disengaged configuration, thereby biasing the ATV towards its first drive configuration.

In some embodiments, a method of shifting an ATV 10 from a first drive configuration to a second drive configuration is carried out by moving a trigger lever 210 of a shifter assembly 100 from a first position to a second position. During at least part of such travel, the trigger lever 210 is engaged with a cam 300 of the shifter assembly 100 such that the cam 300 is similarly moved from a first position to a second position. A first end 512 of an inner wire 510 of a linkage assembly 500 is secured to the cam 300 such that movement of the cam 300 between its first and second positions causes the linkage assembly 500 to move between corresponding first and second configurations, thereby moving a second end of the linkage assembly 500 relative to a gear case 600 of the ATV so as to facilitate moving the gear case 600 between corresponding first and second configurations associated with corresponding first and second drive configurations of the ATV. In some embodiments, the method further includes moving the trigger lever 210 away from its second position while retaining the cam 300 in its second position, thereby disengaging the trigger lever 210 from the cam 300 while retaining the ATV 10 in its second drive configuration. In some embodiments, the method further includes engaging the cam 300 with a ratchet assembly 400 of the shifter assembly 100 so as to retain the cam 300 in its second position after the trigger lever 210 becomes disengaged from the cam 300. In some embodiments, the method further includes disengaging the cam 300 from the ratchet assembly 400 and moving the cam 300 from its second position to its first position, thereby causing the ATV to move from its second drive configuration to its first drive configuration. In some embodiments, the method further includes moving the trigger lever 210 from its first position to its second position so as to cause the cam 300 to become disengaged from the ratchet assembly 400.

In some embodiments, the shifter assembly 100 engages with one or more differential lock such that operation of the trigger lever 210 of the trigger assembly 200 of the shifter assembly 100 moves the differential lock between a locked and an unlocked configuration. In some embodiments, a first trigger lever of the shifter assembly 100 is configured to operate the differential lock and a second trigger lever is configured to change the ATV from a first drive configuration to a second drive configuration. In some embodiments, a first shifter assembly is configured to operate the differential lock and a second shifter assembly is configured to change the ATV from a first drive configuration to a second drive configuration.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A vehicle comprising a shifter assembly for changing between a first drive configuration and a second drive configuration of the vehicle, the shifter assembly comprising:
   a cam having a position indicator, the cam being rotatable about a first axis between first and second cam orientations such that the position indicator is moveable between first and second indicator positions, respectively;
   a trigger assembly that is configured to engage with the cam; and
   a housing defining a window, the position indicator comprising first and second portions, the first portion of the position indicator being viewable through the window and the second portion of the position indicator being concealed by the housing,
   wherein the first and second indicator positions are associated with the respective first and second drive configurations of the vehicle.

2. The vehicle of claim 1, wherein at least a portion of the position indicator extends into the window.

3. The vehicle of claim 1, further comprising a lens cover positioned over at least a part of the window.

4. The vehicle of claim 1, wherein the housing comprises a bottom portion and a top portion secured together to form an interior area, the cam being positioned at least partially within the interior area of the housing.

5. The vehicle of claim 1, further comprising a ratchet assembly for engaging with the cam when the cam is in the second cam orientation, the ratchet assembly being moveable between a locked configuration and an unlocked configuration, the locked configuration of the ratchet assembly being configured to inhibit rotation of the cam such that the position indicator is retained at the second indicator position, thereby locking the vehicle in the second drive configuration, wherein the trigger lever is free to rotate towards the first trigger position while the position indicator is retained at the second indicator position.

6. A vehicle comprising a shifter assembly for changing between a first drive configuration and a second drive configuration a of the vehicle, the shifter assembly comprising:
   a cam having a position indicator, the cam being rotatable about a first axis between first and second cam orientations such that the position indicator is moveable between first and second indicator positions, respectively; and
   a trigger assembly having a trigger lever and an engagement pin extending therefrom, the trigger lever being rotatable about the first axis such that the trigger lever is moveable between first and second trigger positions,
   wherein the cam defines an engagement lip displaced from the first axis,
   wherein the engagement pin is displaced from the first axis and is configured to engage with the engagement lip of the cam when rotation of the cam and trigger lever are synchronized, thereby enabling the trigger assembly to influence rotation of the cam, and
   wherein the first and second indicator positions are associated with the respective first and second drive configurations of the vehicle.

7. The vehicle of claim 6, further comprising a ratchet assembly for engaging with the cam when the cam is in the second cam orientation, the ratchet assembly being moveable between a locked configuration and an unlocked configuration, the locked configuration of the ratchet assembly being configured to inhibit rotation of the cam such that the position indicator is retained at the second indicator position, thereby locking the vehicle in the second drive configuration.

8. The vehicle of claim 7, wherein the trigger lever is free to rotate towards the first trigger position while the position indicator is retained at the second indicator position.

9. The vehicle of claim 7, wherein the ratchet assembly comprises:
   a ratchet gear rotatable in a first direction about a second axis, the second axis being displaced from the first axis; and
   a stop mechanism engaged with the ratchet gear, the stop mechanism being configured to inhibit rotation of the ratchet gear in a second direction about the second axis.

10. The vehicle of claim 9, wherein the ratchet gear comprises a first portion for selective engagement with the trigger assembly and a second portion for selective engagement with the cam, the first portion being rotatably fixed to the second portion.

11. The vehicle of claim 10, wherein the cam defines a locking lip that is configured to engage with a tooth of the second portion of the ratchet gear when the ratchet assembly is in the locked configuration, the cam being biased towards the first cam orientation and the engagement of the locking lip with the tooth preventing rotation towards the first cam orientation.

12. The vehicle of claim 10, wherein the stop mechanism comprises a stop pawl and a stop biasing member for biasing the stop pawl into engagement with the second portion of the ratchet gear.

13. The vehicle of claim 12, wherein the stop biasing member comprises a torsion spring engaged with a proximal end of the stop pawl, wherein a preload of the torsion spring biases a distal end of the stop pawl into engagement with the first portion of the ratchet gear.

14. The vehicle of claim 13, wherein the trigger assembly further comprises an advancement mechanism comprising an advancement pawl having proximal and distal ends and an advancement biasing member engaged with the proximal end of the advancement pawl, wherein the distal end of the advancement pawl is configured to engage with the first portion of the ratchet gear as the trigger lever moves towards the second trigger position, and wherein the advancement biasing member is configured to facilitate disengagement of the advancement pawl from the ratchet gear as the trigger lever moves back towards the first trigger position.

15. The vehicle of claim 14, wherein the advancement biasing member comprises a torsion spring engaged with the proximal end of the advancement pawl, wherein a preload of the torsion spring biases the distal end of the stop pawl into engagement with the first portion of the ratchet gear, and wherein the engagement pin extends through the advancement biasing member and the advancement pawl.

16. A method of mechanically shifting an all-terrain vehicle (ATV) between first and second drive configurations by using a trigger assembly of a shifter assembly to move a cam of the shifter assembly between respective first and second cam orientations, the method comprising:
  engaging the trigger assembly with the cam;
  moving a trigger lever of the trigger assembly from a first trigger position to a second trigger position while the trigger assembly remains engaged with the cam, thereby moving the cam from the first cam orientation to the second cam orientation; and
  disengaging the trigger assembly from the cam while retaining the cam at the second cam orientation.

17. The method of claim 16, further comprising moving the trigger lever back to the first trigger position while retaining the cam at the second cam orientation.

18. The method of claim 17, further comprising moving the trigger lever from the first trigger position to the second trigger position, thereby reengaging the trigger assembly with the cam.

19. The method of claim 18, further comprising moving the trigger lever from the second trigger position to the first trigger position while the trigger assembly remains engaged with the cam, thereby moving the cam from the second cam orientation back to the first cam orientation.

20. The method of claim 19, further comprising:
  engaging the cam with a ratchet assembly, thereby facilitating retention of the cam at the second cam orientation; and
  disengaging the cam from the ratchet assembly, thereby facilitating movement of the cam back to the first cam orientation.

* * * * *